United States Patent
Annan et al.

(10) Patent No.: US 7,167,124 B2
(45) Date of Patent: Jan. 23, 2007

(54) DATA ACQUISITION FOR A GROUND PENETRATING RADAR SYSTEM

(75) Inventors: Alexander Peter Annan, Mississauga (CA); Steve Cosway, Brampton (CA)

(73) Assignee: Sensors & Software Inc., Mississauga (CA)

( * ) Notice: Subject to any disclaimer, the term of this patent is extended or adjusted under 35 U.S.C. 154(b) by 0 days.

(21) Appl. No.: 11/314,013

(22) Filed: Dec. 22, 2005

(65) Prior Publication Data

US 2006/0279450 A1 Dec. 14, 2006

Related U.S. Application Data

(60) Provisional application No. 60/638,144, filed on Dec. 23, 2004.

(51) Int. Cl.
*G01V 3/12* (2006.01)
*G01V 3/17* (2006.01)
*G01S 7/02* (2006.01)
*G01S 13/08* (2006.01)
*G01S 13/42* (2006.01)
*G01S 13/00* (2006.01)

(52) U.S. Cl. ............... 342/22; 342/89; 342/104; 342/118; 342/175; 342/195

(58) Field of Classification Search ............ 342/21, 342/22, 25 R–25 F, 82, 89–118, 127–145, 342/175, 176, 179, 190–197, 83–88
See application file for complete search history.

(56) References Cited

U.S. PATENT DOCUMENTS

| | | | |
|---|---|---|---|
| 4,072,942 A | * | 2/1978 | Alongi ............ 342/22 |
| 4,297,699 A | * | 10/1981 | Fowler et al. ............ 342/22 |
| 4,430,653 A | * | 2/1984 | Coon et al. ............ 342/22 |
| 4,698,634 A | * | 10/1987 | Alongi et al. ............ 342/22 |
| 4,905,008 A | * | 2/1990 | Kawano et al. ............ 342/22 |
| 5,392,046 A | | 2/1995 | Hughes |
| 5,420,589 A | * | 5/1995 | Wells et al. ............ 342/22 |
| 5,608,404 A | | 3/1997 | Burns et al. |
| 5,900,833 A | * | 5/1999 | Sunlin et al. ............ 342/22 |
| 6,377,201 B1 | | 4/2002 | Chu |

(Continued)

FOREIGN PATENT DOCUMENTS

CA 2266222 9/1999
WO WO 97/41449 11/1997

OTHER PUBLICATIONS

Annan, A.P., 2002, GPR—History, Trends and Future Developments; In Subsurface Sensing Technologies and Applications, vol. 3, No. 4 (Oct. 2002), Springer Netherlands, p. 253-270.
Annan, A.P., 2005, Ground Penetrating Radar—Principles, Procedures & Applications; in Near-Surface Geophysics, IG No. 3, edited by Dwain K. Butler, Society of Exploration Geophysicists, p. 351-432.

(Continued)

*Primary Examiner*—Bernarr E. Gregory
(74) *Attorney, Agent, or Firm*—Bereskin & Parr (57) ABSTRACT

A system and method for measuring ground penetrating radar data is described which includes controlling the timing for generating stimulus electromagnetic waves and the sampling rate of reflected electromagnetic waves in response to the stimulus electromagnetic waves. Generally, the timing is adjusted for spatially over-sampling the ground penetrating radar data. The speed of the system can also be adjusted based on the measured data.

25 Claims, 5 Drawing Sheets

U.S. PATENT DOCUMENTS

| | | |
|---|---|---|
| 6,445,334 B1 | 9/2002 | Bradley et al. |
| 6,501,413 B1 | 12/2002 | Annan et al. |
| 6,866,098 B1 | 3/2005 | Arndt et al. |
| 2002/0080057 A1 | 6/2002 | Annan et al. |
| 2005/0184731 A1 | 8/2005 | Warren et al. |

OTHER PUBLICATIONS

U.S. Environmental Protection Agency, Field Analytic Technologies Encyclopedia, Ground Penetrating Radar, 8 pages printed Oct. 18, 2005 from website http://fate.clu-in.org/GPR_main.html.

Ground Penetrating Radar Survey Design, Sensors & Software Inc., Mississauga, Ontario, Canada copyright 1992-1999.

Daniels, Jeffrey J. Ground Penetrating Radar Fundamentals, Department of Geological Sciences, The Ohio State University, prepared as an appendix to a report to the U.S. EPA, Region V, Nov. 25, 2000.

Smemoe, Christopher M., Processing and Visualization of Ground Penetrating Radar Data for Assessing Natural Hydrogeologic Conditions, Civil and Environmental Engineering 540—Term Paper, Brigham Young University, Fall Semester 2000.

* cited by examiner

DATA ACQUISITION FOR A GROUND PENETRATING RADAR SYSTEM

REFERENCE TO RELATED APPLICATION

This application claims priority from U.S. Provisional Patent Application Ser. No. 60/638,144 filed on Dec. 23, 2004.

FIELD

Various methods and systems are described herein relating to data acquisition for a ground penetrating radar system.

BACKGROUND

Ground Penetrating Radar (GPR) uses high-frequency pulsed electromagnetic (EM) waves, typically in the range of 10 MHz to 10 GHz to determine subsurface information. GPR measurements are typically performed in geologic, engineering, hydrologic, and environmental applications. For instance, GPR data may be used to map depth to bedrock, depth to a water table, depth and thickness of soil strata on land and under fresh water bodies, and the location of subsurface cavities and fractures in bedrock. Other applications include determining the location of subsurface objects such as pipes, drums, tanks, and cables, mapping landfill and trench boundaries, mapping contaminants, conducting archaeological investigations, inspection of brick, masonry, and concrete structures, roads and railroad studies, and determining ice thickness.

GPR provides subsurface information by detecting changes in EM properties (i.e. at least one of dielectric permittivity, conductivity, and magnetic permeability) due to the soil and rock material, water content, and bulk density of the ground within which the EM waves are directed. The subsurface information may be acquired by using transmitting and receiving antennas placed as close as possible to the ground surface for which subsurface information is desired. The transmitting antenna radiates EM waves that propagate in the subsurface. As the wave spreads out and travels downward, if it hits a buried object or boundary with different electrical properties, then part of the wave energy is reflected or scattered back to the surface, due to contrasts in the EM properties of the subsurface material while part of its energy continues to travel downward. These regions of contrast in EM properties may be referred to as reflection interfaces. Most GPR reflections are due to changes in the relative permittivity of material. The greater the change in relative permittivity at the reflection interface, the great the portion of signal that is reflected. In addition to having a sufficient electromagnetic property contrast, the boundary between the two materials needs to provide a sharp transition within a distance that is on the order of the pulse length or wavelength of the transmitted waves.

The wave that is reflected back to the surface is captured by a receiving antenna, recorded, and analyzed in real-time or offline for later interpretation. The receiving GPR antenna records the reflected waves over a selectable time range. During GPR data analysis, the depths to the reflection interfaces are calculated from the arrival times of the reflected EM waves as well as the estimated EM propagation velocity in the subsurface materials. The velocity is proportional to the inverse square root of the permittivity of the material.

GPR measurements may be made at fixed locations or continuously by pulling a GPR measurement unit by hand or with a vehicle. Conventionally, uniform spatial sampling is desired with a spatial sampling interval that is dictated by the particular GPR application, frequency, and the EM properties of the underlying surface materials. Accordingly, each time an antenna has been moved a fixed distance across the surface of the ground or material that is being investigated, an EM wave is transmitted, and the resulting reflected EM wave is received and recorded. A single record of a transmitted pulse and the resulting reflected EM wave is called a trace, and the spatial difference between measurements is called the trace spacing. The trace spacing is chosen as a function of target size and the objectives of the particular GPR application.

When conducting GPR data measurements, it is also important to select a frequency band for the transmitted EM waves that is optimized for a particular application. For instance, selecting lower frequencies for the transmitted EM waves provides greater penetration with less resolution while selecting higher frequencies for the transmitted EM waves provides less penetration with higher resolution. More specifically, a resolution of a few centimeters can be obtained with high frequency antennas (i.e. 1 GHz) at shallow depths, while lower frequency antennas (i.e. 10 MHz) may have a resolution of approximately one meter at greater depths.

The accuracy of the GPR measurement is due to a variety of factors. Accuracy can be affected by the location of the antennas, the tow speed, the coupling of the antennas to the ground surface, and variations in soil conditions. GPR data is also sensitive to clutter caused by boulders, animal burrows, and tree roots as well as other natural sources. Other sources of clutter include reflections from nearby vehicles, buildings, fences, power lines, and other man-made sources. Electromagnetic transmissions from cellular telephones, two-way radios, television, and radio and microwave transmitters may cause noise on GPR records. In these latter cases, shielded antennas may be useful to limit these types of reflections.

The GPR data is displayed such that it closely approximates an image of the subsurface, with the anomalies that are associated with the objects of interest located in their proper spatial positions. Different types of displays include single traces (an A-scan), 2D displays (a B-scan) and 3D displays (a C-scan). A single trace can be used to detect objects (and determine their depth) below a spot on the surface. The A-scan consists of the transmitted energy pulse followed by pulses that are received from reflecting objects or layers.

By moving the antenna over the surface and recording traces at a fixed spacing, a section of traces is obtained to provide the B-scan. The horizontal axis of the B-scan is surface position, and the vertical axis is the round-trip travel time of the electromagnetic wave. B-scan displays have become the normal mode of two-dimensional data presentation for GPR data and may include assigning a color (or a variation of color intensity) to amplitude ranges on the trace.

The C-scan is a 3D representation created from a series of 2D B-scans. The C-scan is fundamentally a block view of GPR traces that are recorded at different positions on the surface. Accurate location of each trace is critical to producing accurate 3D displays. Normally, 3D block views are constructed which may then be viewed in a variety of ways, including as a solid block or as block slices.

Simplifying the image, by eliminating noise and clutter is one technique for optimizing the interpretation of the recorded data. As is well known by those skilled in the art, image simplification may be achieved by assigning appropriate amplitude-color ranges, using a limited number of colors, as well as decreasing the size of the data set that is displayed as the complexity of the target increases. Further image simplification in cases of very complex (or multiple) targets may also be achieved by displaying only the peak values (maximum and minimum values) for each trace.

SUMMARY

Various methods and systems are described herein for measuring ground penetrating radar data which includes controlling the timing for generating stimulus electromagnetic waves and the sampling rate of reflected electromagnetic waves in response to the stimulus electromagnetic waves. Generally, the timing is adjusted for spatially over-sampling ground penetrating radar data. The speed of the system can be changed based on the measured data.

In one aspect, a ground penetrating radar measurement system is described for measuring ground penetrating radar (GPR) data. The measurement system comprises: a control unit for controlling the operation of the measurement system; a sampling coordination unit connected to the control unit for controlling the timing of generation of stimulus electromagnetic waves and spatial sampling rate of reflected electromagnetic waves created in response to the stimulus electromagnetic waves, the sampling coordination unit being adapted to adjust the timing of the generation of the stimulus electromagnetic waves such that the rate of sampling the reflected electromagnetic waves spatially over-samples the ground penetrating radar data with respect to a minimum Nyquist spatial sampling interval; and transmission circuitry and receiving circuitry both connected to the control unit and the sampling coordination unit. The transmission circuitry generates the stimulus electromagnetic waves and the receiving circuitry senses and records the reflected electromagnetic waves. The system further comprises a motion detection module connected to one of the sampling coordination unit and the control unit for providing speed and position information of the measurement system. The sampling coordination unit adjusts the amount of spatial over-sampling according to the speed of the measurement system.

In at least some cases, the measurement system further includes an operator feedback module connected to the control unit for providing an operator of the measurement system with a GPR data quality indicator for informing the operator to increase or decrease the speed of the measurement system.

In at least some cases, the GPR data quality indicator can include a numerical value.

In at least some cases, the GPR data quality indicator can include graphical information.

In at least some cases, the GPR data quality indicator can reflect or indicate the Signal-to-Noise Ratio (SNR) of the measured GPR data.

In at least some cases, the GPR data quality indicator can include an image of the measured GPR data.

In at least some cases, the SNR can be maintained at a desired level by adjusting the speed (v) of the measurement system according to:

$$v = \frac{n}{\delta B}\left(\frac{SNR_{REF}}{SNR_{DES}}\right)^2$$

where n is the Nyquist spatial sampling interval, δ is an instrumentation dependent factor for the measurement system, B is a maximum time of flight for a GPR trace, $SNR_{REF}$ is the current signal-to-noise level of the measured GPR data, and $SNR_{DES}$ is the desired signal-to-noise level of the measured GPR data.

In at least some cases, the GPR data quality indicator can be recorded along with the measured GPR data.

In at least some cases, the operator is provided by an automated means. The automated means can include a motion controlled robotic hand, a control system, a vehicle and the like.

In at least some cases, the transmission circuitry includes a transmitter unit and at least one transmitter antenna for generating the stimulus electromagnetic waveforms and radiating the stimulus electromagnetic waveforms into a subsurface environment, and the receiving circuitry includes at least one receiver antenna and a receiver unit for sensing the reflected electromagnetic waves.

In another aspect, a ground penetrating radar measurement system is described for measuring ground penetrating radar (GPR) data. The measurement system comprises: a control unit for controlling the operation of the measurement system; a sampling coordination unit connected to the control unit for controlling the timing of generation of stimulus electromagnetic waves and spatial sampling rate of reflected electromagnetic waves in response to the stimulus electromagnetic waves; transmission circuitry connected to the control unit and the sampling coordination unit, the transmission circuitry generates the stimulus electromagnetic waves; receiving circuitry connected to the control unit and the sampling coordination unit, the receiving circuitry senses and records the reflected electromagnetic waves; and, an operator feedback module connected to the control unit for providing an operator of the measurement system with a GPR data quality indicator for informing the operator to increase or decrease the speed of the measurement system based on a desired level of signal quality for measured GPR data.

In at least some cases, the quality of the measured GPR data can be maintained at a desired level by adjusting the speed (v) of the measurement system according to:

$$v = \frac{n}{\delta B}\left(\frac{SNR_{REF}}{SNR_{DES}}\right)^2$$

where n is the Nyquist spatial sampling interval, δ is an instrumentation dependent factor for the measurement system, B is a maximum time of flight for a GPR trace, $SNR_{REF}$ is the current signal-to-noise level of the measured GPR data, and $SNR_{DES}$ is the desired signal-to-noise level of the measured GPR data.

In at least some cases, the measurement system further includes a motion detection module connected to one of the sampling coordination unit and the control unit for providing speed and position information of the measurement system, wherein the sampling coordination unit adjusts the spatial sampling rate according to the speed of the measurement system to over-sample the GPR data with respect to a minimum Nyquist spatial sampling interval.

In another aspect, a method for controlling the measurement of ground penetrating radar (GPR) data by a GPR measurement system is described. The method comprises:

a) generating a sampling factor for spatially over-sampling the GPR data according to the speed and position information and with respect to a minimum Nyquist spatial sampling interval;
b) adjusting the rate of generation of stimulus electromagnetic waves according to the sampling factor;
c) adjusting the sampling rate of reflected electromagnetic waves in response to the stimulus electromagnetic waves according to the sampling factor;
d) detecting speed and position information of the measurement system, and decreasing the value of the sampling factor when the speed of the measurement system is increased and increasing the value of the sampling factor when the speed of the measurement system is decreased; and
e) measuring the GPR data.

In at least some cases, the method further includes providing a GPR data quality indicator to an operator of the measurement system for informing the operator to increase or decrease the speed of the measurement system based on a desired level of signal-to-noise quality of measured GPR data.

In at least some cases, the method can include incorporating a numerical value into the GPR data quality indicator.

In at least some cases, the method can include incorporating graphical information into the GPR data quality indicator.

In at least some cases, the method can include incorporating Signal-to-Noise Ratio (SNR) of the measured GPR data into the GPR data quality indicator.

In at least some cases, the method can include providing an image of the measured GPR data as the GPR data quality indicator.

In at least some cases, the method can include maintaining the SNR of the measured GPR data at a desired level by adjusting the speed (v) of the measurement system according to:

$$v = \frac{n}{\delta B} \left( \frac{SNR_{REF}}{SNR_{DES}} \right)^2$$

where n is the Nyquist spatial sampling interval, δ is an instrumentation dependent factor for the measurement system, B is a maximum time of flight for a GPR trace, $SNR_{REF}$ is the current signal-to-noise level of the measured GPR data, and $SNR_{DES}$ is the desired signal-to-noise level of the measured GPR data.

In at least some cases, the method can include recording the GPR data quality indicator along with the GPR data.

In another aspect, a method for controlling the measurement of ground penetrating radar (GPR) data by a GPR measurement system is described. The method comprises:
a) generating a sampling factor for sampling the GPR data with respect to a minimum Nyquist spatial sampling interval;
b) adjusting the rate of generation of stimulus electromagnetic waves according to the sampling factor;
c) adjusting the sampling rate of reflected electromagnetic waves in response to the stimulus electromagnetic waves according to the sampling factor;
d) measuring the GPR data; and,
e) providing a GPR data quality indicator based on the measured GPR data to an operator of the measurement system for informing the operator to increase or decrease the speed of the measurement system.

In at least some cases, the method further includes maintaining the level of signal quality of measured GPR data at a desired level by adjusting the speed (v) of the measurement system according to:

$$v = \frac{n}{\delta B} \left( \frac{SNR_{REF}}{SNR_{DES}} \right)^2$$

where n is the Nyquist spatial sampling interval, δ is an instrumentation dependent factor for the measurement system, B is a maximum time of flight for a GPR trace, $SNR_{REF}$ is the current signal-to-noise level of the measured GPR data, and $SNR_{DES}$ is the desired signal-to-noise level of the measured GPR data.

In at least some cases, step a) of the method includes detecting speed and position information of the measurement system and adjusting the sampling factor according to the speed of the measurement system.

In another aspect, a method for measuring ground penetrating radar (GPR) data with a GPR measurement system is described. The method comprises:
a) setting a value for a sampling factor for sampling the GPR data;
b) measuring the GPR data according to the sampling factor;
c) reviewing operator feedback based on the quality of the measured GPR data; and,
d) adjusting the speed of the GPR measurement system based on the operator feedback.

BRIEF DESCRIPTION OF THE DRAWINGS

For a better understanding of the various methods and systems described herein and to show more clearly how they may be carried into effect, reference will now be made, by way of example only, to the accompanying drawings in which.

DETAILED DESCRIPTION

It will be appreciated that for simplicity and clarity of illustration, elements shown in the figures have not necessarily been drawn to scale. Further, where considered appropriate, reference numerals may be repeated among the figures to indicate corresponding or analogous elements. In addition, numerous specific details are set forth in order to provide a thorough understanding of the methods and systems described herein. However, it will be understood by those of ordinary skill in the art that the methods and systems may be practiced without these specific details. In other instances, methods, procedures and components that are well known to those skilled in the art have not been described in detail. Further, the description is not to be considered as limiting the scope of the various methods and systems described herein, but rather as merely providing implementation details.

Typically the selection of spatial spacing, or trace spacing, between successive radar trace measurements while performing GPR measurements is closely linked to the center operating frequency of the transmitting and receiving antennas as well as the dielectric properties of the sub-surface materials that are being scanned. However, in order to ensure that the recorded GPR data is not spatially aliased, the Nyquist spatial sampling should be satisfied as is well known by those skilled in the art. The Nyquist spatial sampling interval is nominally a quarter of the wavelength in the host material and may be expressed in meters as:

$$n = \frac{c}{4f\sqrt{K}} \quad (1)$$

where f is the antenna center frequency (in MHz), K is the expected average relative permittivity of the subsurface material and c is the speed of light ($3 \times 10^8$ m/s). The spatial sampling interval is the physical distance between which consecutive traces are sampled which is also known as trace spacing.

In conventional GPR systems, from a practical viewpoint, the amount of recorded data and the amount of survey time are both reduced by increasing the trace spacing. In addition from a data interpretation standpoint, satisfying the Nyquist time and spatial sampling interval is important. Further, the conventionally accepted view by those skilled in the art for GPR systems is that there is nothing to be gained by spatial over-sampling.

However, the spatial sampling interval relative to the Nyquist spatial sampling interval will have an effect on the ability to observe steeply dipping reflectors and flat lying reflector responses in the recorded GPR data. Accordingly, the trace spacing can be selected as a tradeoff between detecting these different types of reflectors.

When describing sensor position, the position can be described as a vector which defines the three dimensional location of the sensor. Similarly, velocity can be described as a vector defining three-dimensional motion. For the purposes of this description, the three-dimensional aspect will be treated as implicit and only single dimension scalar quantities will be used to represent vector position and velocity. In the following, x will denote sensor position and v will denote velocity in the x direction.

Figure 1:
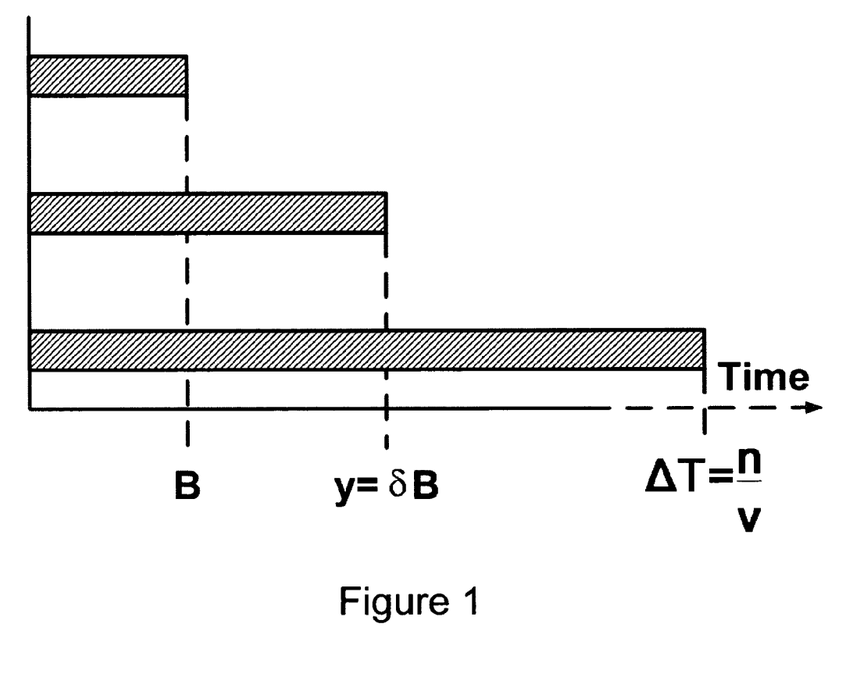
FIG. 1 is a plot illustrating conventional data acquisition for a GPR system.

Referring now to FIG. 1, shown therein are three time intervals that must be accounted for when acquiring GPR data from a moving platform (i.e. when the GPR measurement system is towed by a vehicle or moved by hand). First, there is a maximum time of flight B, for a given GPR application, which is defined by the maximum desired target distance divided by the speed of radio wave propagation (the target is a sub-surface object that is to be detected by the GPR system). In other words, the parameter B is the time of flight for a GPR signal to travel the maximum desired measurement distance to the target and then back to the GPR measurement system. Second, there is an acquisition time y that is required by the GPR measurement system to acquire the desired signal prior to a repetition of the GPR measurement. The acquisition time y is longer than the maximum time of flight B and can be defined, for example, as shown in equation 2.

$$y = \delta B \quad (2)$$

The parameter $\delta$ is an instrumentation dependent factor which is larger than unity and is a real number. Finally, there is the time interval $\Delta T$ which is the time taken by the GPR sensor or GPR measurement system to travel the Nyquist spatial sampling interval n. The time interval $\Delta T$ can be defined by equation 3.

$$\Delta T = \frac{n}{v} \quad (3)$$

With GPR measurement systems, it is not uncommon to have values of B=10 ns, y=1 μs and $\Delta T$=50 ms.

The GPR response at any measurement position can be expressed mathematically as $w(x, \gamma)$ where $\gamma$ is the normal time delay associated with GPR signal time of flight, namely, distance divided by the speed of radio wave propagation. The value of $\gamma$ ranges from 0 to B. If the GPR sensor is moving with speed (i.e. velocity v), which is very slow compared to the speed of radio wave propagation which is typically the speed of light c, the GPR response can be viewed as being doubly time dependent with $\gamma$ representing time in the time of flight signal domain and T being time involved in sensor motions with $\gamma$ being much smaller than T. Defining time for sensor motion as T, then the GPR response can be expressed by equation 4.

$$w(x, \gamma) = w(vT, \gamma) \quad (4)$$

For all intents and purposes, the velocity v of the sensor (i.e. GPR measurement system) is so small compared to the speed of light c that the GPR measurement time is essentially instantaneous and the position x of the GPR measurement system can be viewed as constant over the GPR acquisition interval $\delta B$.

To recover the GPR response with full fidelity, the GPR response $w(x, \gamma)$ need only be measured at discrete spatial intervals that are less than the Nyquist spatial interval n. Accordingly, the GPR response can be acquired at discrete spatial intervals $\Delta x$ where $\Delta x \leq n$. Assuming that $\Delta x = n$, then the sensor motion time T can be discretized into intervals $\Delta T$ where:

$$\Delta x = v \cdot \Delta T \quad (5)$$

which yields equation (3) when $\Delta x = n$.

As has been mentioned previously, $\Delta T$ will often be much larger than the GPR acquisition time $y = \delta B$. If the GPR sensor acquires data at intervals $\Delta T$ and $y << \Delta T$, then the GPR system is essentially "dormant" for a large amount of the time. While sampling the data at smaller $\Delta T$ intervals will not provide more information for an ideal GPR response that has achieved Nyquist spatial sampling, the measured GPR response $w(x, \gamma)$ is also dependent on the presence of noise in the time of flight domain $\gamma$. Accordingly, a GPR measurement at a fixed position x can be viewed as the combination of an ideal GPR response $w_{TRUE}(x, \gamma)$ with an additional noise component $n(\gamma)$ as expressed in equation 6:

$$w(x, \gamma) = w_{TRUE}(x, \gamma) + n(\gamma) \quad (6)$$

where $n(\gamma)$ is time varying noise in the time of flight domain $\gamma$. If the noise $n(\gamma)$ is random and has zero mean, which is quite typical of external interference noise present in measured GPR signals, then averaging repeated GPR measurements w(x, γ) will yield an improved estimate of the ideal or true GPR response $w_{TRUE}(x, γ)$. For instance, denoting the statistical expectation operator as < >, then averaging the measurements to obtain an averaged measurement yields a measurement which approaches the ideal GPR response as shown in equation 7:

$$<w(x, γ)> = w_{TRUE}(x, γ) + <n> = w_{TRUE}(x, γ) \quad (7)$$

since <n>=0.

The degree to which the averaged GPR measurement approaches the ideal GPR response is reflected in the variance of the averaged GPR measurement. When N GPR measurements are averaged, the variance of the averaged GPR measurement is expressed by equation 8:

$$\sqrt{\langle (w(\overline{x}, Y) - w_{TRUE}(\overline{x}, Y))^2 \rangle} = \frac{\sigma}{\sqrt{N}} \quad (8)$$

where σ is the standard deviation of the noise component n(γ). Accordingly, it can be seen that spatially sampling the GPR measurements $w(\overline{x}, γ)$ to adhere to the Nyquist spatial sampling rate while over-sampling (i.e. choosing a Sampling Factor (SF) to be larger than unity), provides an opportunity to reduce the noise in the averaged GPR measurement as shown in equation 8. The reduction of noise leads to an increase in the signal-to-noise ratio (SNR) of the averaged GPR measurement which allows one to see further into the surface or to see more detail at a given depth below the surface.

The improvement in SNR can be estimated from measurement needs, system parameters and system velocity. Since the Nyquist spatial sampling interval is defined by Δx, then the time interval ΔT between measurements can be represented by equation 9:

$$\Delta T = \frac{|\Delta x|}{|v|} \quad (9)$$

and the SF can be represented by equation 10:

$$SF = \frac{|\Delta x|}{|v|} \cdot \frac{1}{\gamma B} = \frac{\Delta T}{\gamma B} \quad (10)$$

and the averaging value N can be represented by equation 11:

$$N = \text{int}(SF) \quad (11)$$

where int( ) indicates that the value for the SF is to be rounded down to the next closest integer number.

It general, for most cases, the speed of movement of the GPR measurement system dictates the SF, all other system factors being equal. For random noise, the improvement in signal-to-noise can be expressed directly as $SNR_{improvement} = \sqrt{N}$. Improving signal-to-noise improves exploration depth. In some settings, exploration depth varies directly with SNR while in others depth varies as log(SNR). For a given SF, the velocity v of the GPR sensors can be adjusted according to the desired amount of spatial sampling (i.e. the spatial sampling interval Δx) according to equation 9. Furthermore, the SF can be adjusted to provide GPR data with a certain level of SNR. Accordingly, for a specific application, the GPR sensor measurement speed can be adjusted to achieve a desired quality for the measured GPR data.

Figure 2A:
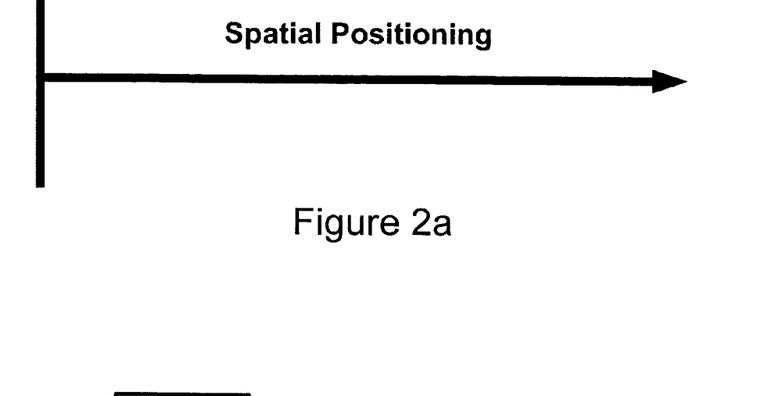
FIGS. 2a–2g are a series of diagrams illustrating oversampling for data acquisition for a GPR system.
Figure 2B:
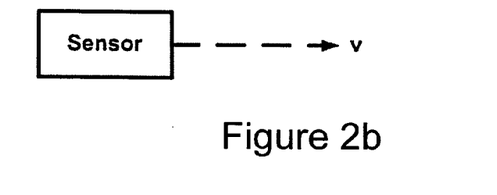
Figure 2C:
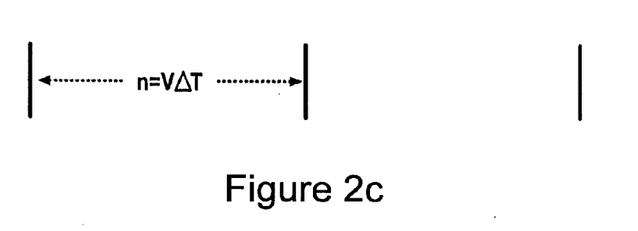
Figure 2D:
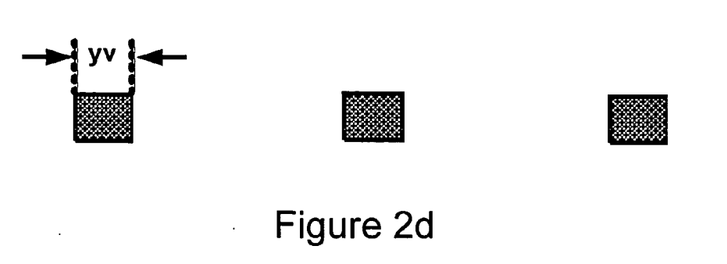
Figure 2E:
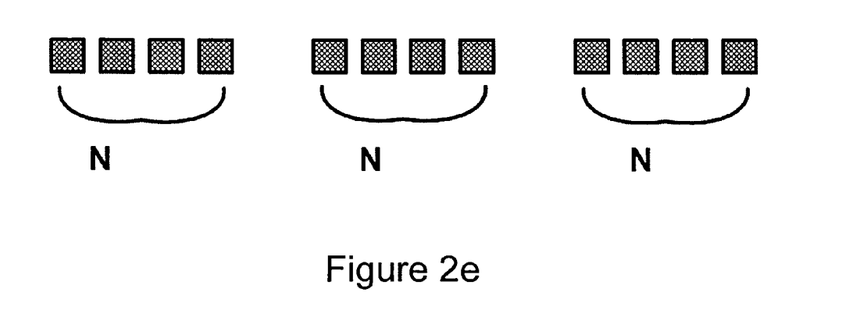
Figure 2F:
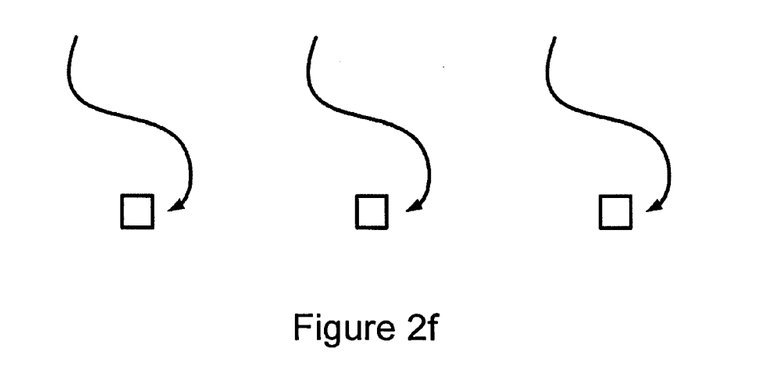
Figure 2G:
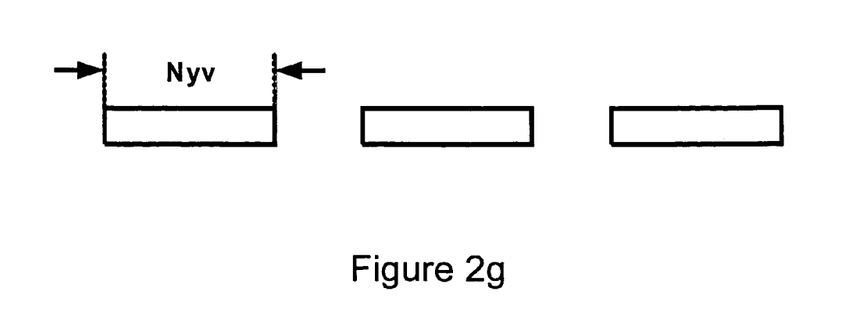

Referring now to FIGS. 2a–2g, shown therein are diagrams that illustrate over-sampling GPR data. FIG. 2a provides an axis for spatial position which increases from left to right (i.e. a GPR measurement system can move from left to right while making measurements). FIG. 2b depicts a sensor moving with a velocity v at an instant of time. FIG. 2c shows the maximum spacing required for data sampling at spatial intervals of n to satisfy the Nyquist spatial sampling rate. FIG. 2d shows the spatial interval |yv| that corresponds to the acquisition time y for making a GPR measurement. FIG. 2e now depicts over-sampling in which N GPR measurements are obtained for each location that was sampled with one GPR measurement in FIG. 2d. If y<<ΔT, then a multiplicity of measurements can be made before the sensor has moved a distance n. FIG. 2e depicts the spatial extent of over-sampling. FIG. 2e also shows that in some implementations, over-sampling does not have to be done continuously, but rather can be done just around the desired sampling locations. FIG. 2f depicts the result of averaging the N GPR measurements at each desired sampling location. The multiplicity of GPR measurements can be averaged in a selective manner to achieve a resultant set of sampled data that meet the Nyquist sampling criterion. FIG. 2g shows the spatial extent of over-sampling, i.e. data is now acquired over a spatial interval of N|yv| rather than |yv| as in FIG. 2d. Accordingly, the averaged measurement data will have a wider spatial extent than cases in which only single measurement data are acquired as depicted in FIG. 2d although the spatial extent will be a fractional part of n spatial shift. Provided that the Nyquist spatial sampling rate is achieved, then there is no loss of information and the averaging yields an improvement in signal-to-noise ratio in the GPR measurement time of flight domain.

Another point to consider is that for GPR data acquisition, the GPR measurement system is typically mounted on a moveable platform such as a push-cart that is pushed by an operator or a vehicle that is driven by the operator. In both cases, the movement speed of the GPR measurement system is controlled by the operator. An operator may be a human operator, or an automated means such as a motion controlled robotic hand, a control system, a vehicle and the like. Accordingly, the GPR measurement system may be augmented to indicate to the operator how fast the GPR measurement system should be moving in order to obtain GPR data with an acceptable level of signal quality where signal quality can be increased by a factor of $\sqrt{N}$ in terms of signal-to-noise improvement when the SF is equal to N. Basically, the operator can be trained so that the slower the operator moves, the better will be the quality of the GPR data since with a slower speed, more GPR data is acquired for averaging. Equation 10 indicates that for a given spatial sampling interval Δx, the SF can be increased by reducing the velocity of the GPR measurement system. An increase in SF increases the SNR of the measured GPR data as shown in equation 8. The speed control can be achieved by providing operator feedback which in some cases can be based on the SNR of the acquired GPR data as will be explained in further detail below. In some implementations, the operator feedback can be based on a GPR data quality indicator. Alternatively, in some implementations, the SF can be adjusted given a required Δx and the current speed of the measurement system according to equation 10.

Further, simple averaging is not the only type of averaging that can be done to increase the SNR of the recorded GPR traces. For instance, one may use inverse-weighted averages in which a given GPR trace may be inversely weighted by the amount of noise or overall power in the given GPR trace. Accordingly, noisier GPR traces are given less weight than GPR traces that have a better SNR. Other weighting techniques may also be used such as statistical-based averaging in which a value is calculated for each GPR trace such that a probability distribution is formed from these values and the GPR traces whose values are considered to be an outlier in the probability distribution may be discarded.

Figure 3:
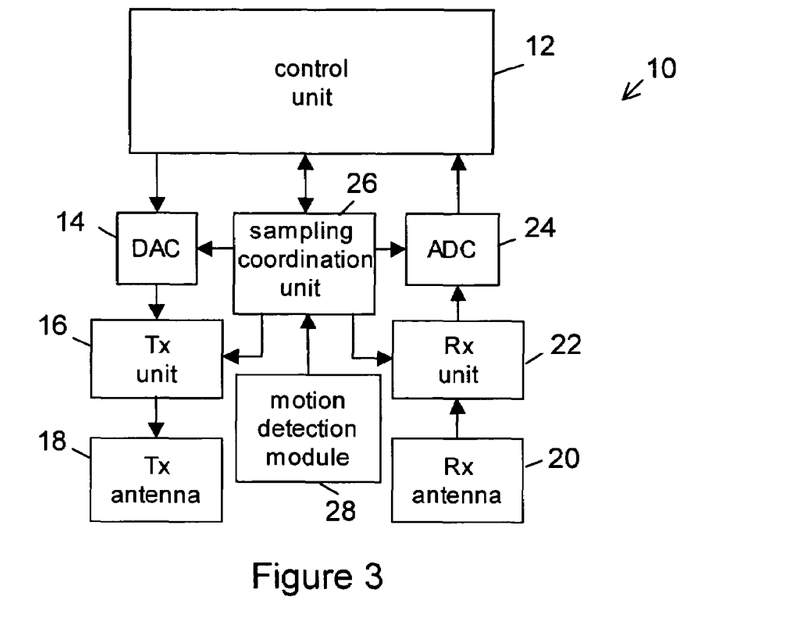
FIG. 3 is a block diagram of an exemplary GPR system that implements variable data acquisition including oversampling.

Referring now to FIG. 3, shown therein is an exemplary GPR measurement system 10 that can perform over-sampling. The GPR measurement system 10 includes a control unit 12, transmission circuitry and receiving circuitry. The transmission circuitry includes a digital-to-analog converter (DAC) 14, a transmitter unit 16, and a transmitter antenna 18. The receiving circuitry includes a receiver antenna 20, a receiver unit 22, and an analog-to-digital converter (ADC) 24. The GPR measurement system 10 further includes a sampling coordination unit 26 and a motion detection module 28 connected as shown. It should be noted that the DAC 14 is optional since in some implementations, the transmitter unit 16 can receive digital signals and generate the stimulus waveforms directly there from.

The control unit 12 controls the operation of the GPR measurement system 10 and can be any suitable controller, microprocessor, digital signal processor and the like. The sampling coordination unit 26 can adjust the spatial sampling rate of the GPR measurement system 10, according to a specified SF and the Nyquist spatial sampling interval, and can synchronize stimulus generation and response recording accordingly. A user can initially specify the SF based on various factors including the GPR application. The motion detection module 28 provides motion information for the velocity of the GPR measurement system 10. Accordingly, based on the motion information, the sampling coordination unit 26 can adjust the SF based on the velocity of the measurement system according to equations 10 and 3. Alternatively, the velocity of the measurement system can be adjusted according to a certain SF. In some measurement systems, the motion detection module 28 can be connected to the control unit 12 and the control unit 12 can provide motion information to the sampling coordination unit 26. Alternatively, in some measurement systems, the functionality of the sampling coordination unit 26 can be provided by the control unit 12.

It should be noted that the GPR measurement system 10 also includes other components that are not shown to simplify the description. These components include a memory unit to store programs that control the operation of the GPR measurement system 10, a mass data storage unit to store field measurements, a data display unit to display GPR related data, a stimulus generator to generate the stimulus EM waves, and processing modules to process and store the recorded GPR data as well as measures of the quality of the recorded GPR data. Other components include an interface unit to allow an operator to interface with the GPR measurement system 10, and a power source. Some of these components may be included within the control unit 12. However, in general, these components are well known to those skilled in the art and will not be further discussed.

In use, the control unit 12 directs the operation of the GPR measurement system 10 which typically includes the generation of stimulus EM waves to be transmitted into the subsurface. In some implementations, the stimulus EM waves can be converted into analog signals by the DAC 14 and then sent to the transmitter unit 16; in other implementations the stimulus EM waves can be sent as digital signals to the transmitter unit 16. The transmitter unit 16 includes appropriate hardware components for further processing the stimulus EM waves prior to transmitting these waves via the transmitter antenna 18 to the subsurface to be investigated. For instance, the transmitter unit 16 may contain amplification stages, filtering stages and mixing stages along with local oscillators, and in some cases digital to analog conversion circuitry as is commonly known to those skilled in the art. The transmitter antenna 18 can be any suitable antenna including a single antenna or an array of antennas as is well known by those skilled in the art.

The reflected EM waves are received by the receiver antenna 20 and then sent to the receiver unit 22 for further processing. In a similar fashion to the transmitter antenna 18, the receiver antenna 20 can be any suitable single antenna or an array of antennas as is well known to those skilled in the art. Also, the receiver unit 22 may contain suitable processing hardware such as amplification stages, filtering stages and mixing stages along with local oscillators as is commonly known to those skilled in the art. The processed reflected EM waves are then converted into digital waveforms by the ADC 24 and then sent to the control unit 12 for further processing. In other instances, the GPR traces can be recorded with analog or digital means.

The recorded GPR data can be filtered in the field to remove noise, or the raw data can be recorded and the data processed for noise removal at a later time. Field filtering for noise removal can consist of analog filtering prior to recording the data on a mass data storage medium.

The recorded GPR data can be further processed using techniques that are known to those skilled in the art. For instance, further processing can include removal or minimization of direct waves from the recorded GPR data. This includes large reflection amplitudes at the interface between the air and soil surface directly below the antennas 18 and 20 of the GPR measurement system 10. Amplitude adjustments can also be made to the recorded GPR data due to battery charge loss. Gain adjustments may also be made to the data due to the attenuation of the GPR signals in ground. Static adjustments can also be made to the recorded GPR data which remove the effects of changes in elevation and effects from leveling the GPR antennas. Data filtering, velocity analysis and migration can also be performed as is well known to those skilled in the art. Migration is a procedure that is used to transform surface-recorded GPR data into data in which the subsurface heterogeneities are located at the correct depth.

The sampling coordination unit 26 may receive timing information from the control unit 12 to direct the transmitter unit 16 to transmit stimulus EM waves along a predefined spatial sampling interval. Alternatively, in some implementations, the timing for the generation of the stimulus EM waves and the sampling of the reflected EM waves can be controlled by the sampling coordination unit 26. The sampling coordination unit 26 can receive motion information which includes velocity and position information for the GPR measurement system 10 that is provided by the motion detection module 28. Based on the current speed of the GPR measurement system 10, the sampling coordination unit 26 can direct the transmitter unit 16 to transmit more stimulus EM waves than would be conventionally done so that the GPR measurement system 10 can record and process a greater amount of GPR data. The timing for this over-sampling can be specified in accordance with the SF which can be defined according to equations 3 and 10. Therefore, when the GPR measurement system 10 is moving at a slower rate, more GPR traces can be measured for a given positional index. Conversely, when the GPR measurement system 10 is moving at a faster rate, a fewer amount of GPR traces can be measured for a given positional index.

Based on the current speed and the SF, the sampling coordination unit 26 can direct the transmission circuitry to transmit a certain number of stimulus EM waves and the receiving circuitry to properly receive and record the reflected EM waves that correspond to the stimulus EM waves. For example, if the SF is 10, then the sampling coordination unit 26 can direct the transmitter unit 16 to generate 10 more stimulus EM waves than usual to obtain GPR data for a range about at least several successive spatial sampling positions.

Figure 4:
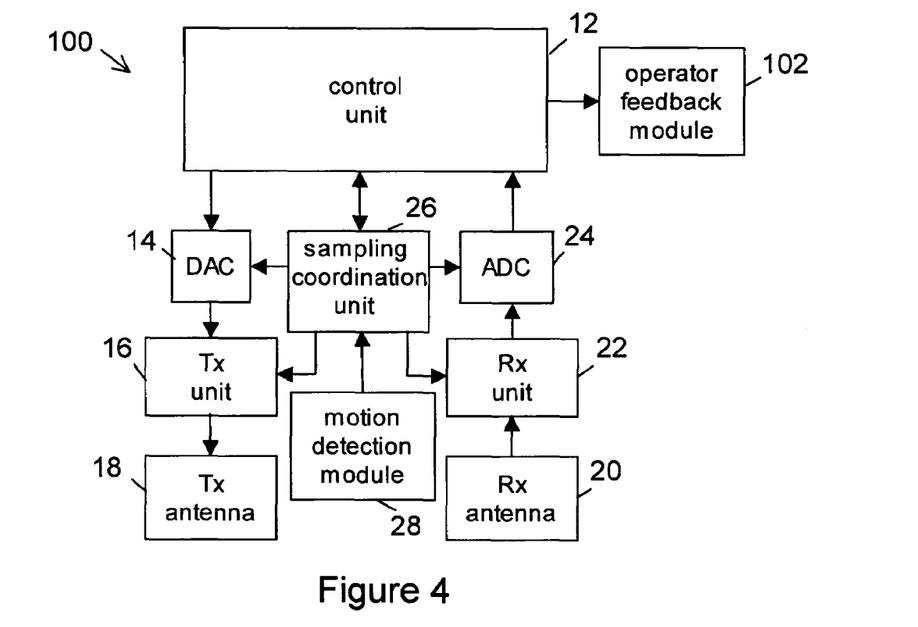
FIG. 4 is a block diagram of another exemplary GPR system that implements data acquisition including oversampling; and, FIG. 5 is a flow chart diagram of an exemplary method for recording GPR data.

Referring now to FIG. 4, shown therein is another GPR measurement system 100 that can perform over-sampling. The GPR measurement system 100 includes an operator feedback module 102 that is connected to the control unit 12. In some cases, the operator feedback module 102 can provide feedback to the operator of the GPR measurement system 100 based on the quality of the GPR data that is currently being recorded. Accordingly, if the quality of the recorded GPR data is poor, which can be determined from the SNR of the GPR data, then the operator feedback module 102 can provide a GPR data quality indicator to the operator, which lets the operator know that the speed of the GPR measurement system 100 should be changed for better signal quality.

The GPR data quality indicator can be a numerical value with a certain acceptable range of values that is updated in real-time. Accordingly, when the numerical value begins to drift outside of a predefined acceptable range, then the operator knows to slow down the speed of the GPR measurement system 100.

Alternatively, the operator feedback module 102 can provide graphical information of the subsurface for the GPR data quality indicator and the operator can be trained to recognize when the image quality is suffering and reduce the speed of the GPR measurement system 100 accordingly. In some implementations, the graphical information can include the raw GPR data or images based on the GPR data.

In another case, the quality of the GPR data may be very good and there may be no need for the GPR measurement system 10 to move so slowly. In this case, the operator feedback module 102 can provide numerical or graphical feedback to instruct the operator to increase the speed of the GPR measurement system.

In both cases, the operator feedback module 102 may directly process the recorded GPR data to calculate the GPR data quality indicator. Alternatively, the recorded GPR data may be processed normally and the processed GPR data may then be analyzed by the operator feedback module 102 to determine the GPR data quality indicator.

In other implementations, based on a specified or desired SF, the speed of the measurement system 10 can be adjusted. This can be done in an automatic fashion by the control unit 12 or by providing feedback to an operator of the measurement system 10.

In some implementations, the operator feedback module 102 can be an automated means such as a robotic controller that controls the speed of the GPR measurement system based on the GPR data quality indicator without human intervention. In other cases, the operator can be a human operator.

In some implementations, the sampling coordination unit 26 of both GPR measurement systems 10 and 100 can adjust the rate at which stimulus EM waves are generated and the sampling rate for sampling the corresponding reflected EM waves based on the SNR of the sampled reflected EM waves. For instance, if the SNR is low, then the sampling coordination unit 26 can increase the stimulus generation rate and the spatial sampling rate to acquire more GPR data to improve SNR. Conversely, if the SNR is high, then the sampling coordination unit 26 can decrease the stimulus generation rate and sampling rate. In these cases, the sampling coordination unit 26 receives an indication of the SNR from the module that processes the GPR data. Those skilled in the art know how to obtain the SNR of the recorded GPR data.

When the velocity of the platform that houses the GPR sensors is controllable either by an operator or by a control system, the quality of the GPR data can be adjusted by varying the GPR sensor velocity. Specifically, the velocity of the GPR sensors can be related to the signal-to-noise ratio of the current GPR data ($SNR_{REF}$) and a desirable signal-to-noise ratio of the GPR data ($SNR_{DES}$) as shown in equation 12.

$$v = \frac{n}{\delta B}\left(\frac{SNR_{REF}}{SNR_{DES}}\right)^2 \quad (12)$$

In other words, the velocity of the GPR measurement system can be adjusted to achieve a desired $SNR_{DES}$ based on the current $SNR_{REF}$ with all due consideration to practical limitations.

In some aspects, the operator feedback module 102 can be seen to control the amount of over-sampling that is done by the GPR measurement system 100. For instance, the operator feedback module 102 provides the GPR data quality indicator to the operator of the measurement system 100 which can then increase or decrease the speed of the measurement system 100. In turn, the sampling coordination unit 26 can adjust the timing of the generation of the stimulus electromagnetic waveforms for a given spatial sampling rate for measuring the reflected electromagnetic waves.

Figure 5:
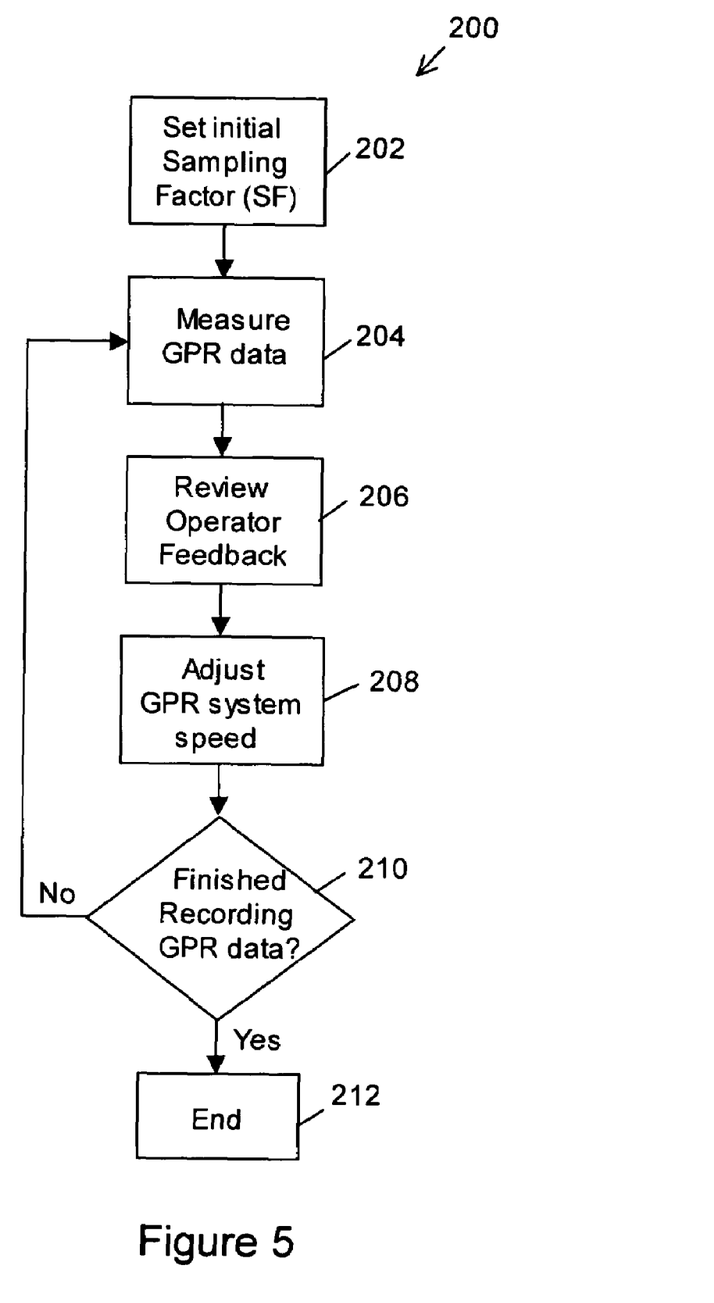

Referring now to FIG. 5, shown therein is an exemplary method 200 for recording GPR data. At step 202, an initial value can be set for the SF. This value can be set based on the current GPR application at hand; for instance, some GPR applications inherently provide data with a lower SNR and so the SF can be initially set to be a higher value than is normally used to improve the SNR of the measured GPR data. In other instances, the anticipated velocity of the GPR measurement system can also be factored into the initial value for the SF.

At step 204, the hardware of the GPR measurement system adjusts the timing for generating stimulus EM waves and recording data based on the current value of the SF. The GPR measurement system then measures GPR data.

At step 206, values for a GPR data quality indicator are produced based on the measured GPR data. The GPR data quality indicator is provided to the operator of the GPR measurement system as feedback to indicate the quality of the measured GPR data. The GPR data quality indicator can be recorded along with the measured data. The GPR data quality indicator can be one or more of numerical data, SNR data, graphical data or raw data as previously explained.

At step 208, the operator of the GPR measurement system can adjust the speed of the GPR system based on the GPR data quality indicator. If the GPR data quality indicator indicates that the quality of the measured GPR data is poor, then the operator of the GPR measurement system can decrease the speed of the GPR measurement system. The GPR measurement system can then also increase the SF to record and process more data to improve the quality of the measured GPR data. Alternatively, if the GPR data quality indicator indicates that the quality of the measured GPR data is excellent, or better than an acceptable level of quality (i.e. based on the SNR of the measured data in some implementations), then the operator can increase the velocity of the GPR measurement system. The GPR measurement system can then also decrease the SF to record and process less data.

At step 210, if the GPR measurement system has finished recording GPR data, then the method 200 moves to step 212 and ends. If the GPR measurement system has not finished recording GPR data, then the method 200 moves to step 204.

Accordingly, based on method 200, an operator of the GPR system can set a value for a sampling factor for sampling the GPR data and then measure the GPR data according to the sampling factor. The operator can then review operator feedback based on the quality of the measured GPR data; and, adjust the speed of the GPR measurement system based on the operator feedback.

It should be understood that various modifications can be made to the various methods and systems described and illustrated herein. For instance, the variable sampling feature can be applied to GPR systems that use multiple transmitting and receiving antennas thereby having several channels of GPR data that are recorded essentially concurrently. Such a multi-channel GPR system is described in Annan et al. (U.S. Pat. No. 6,501,413) which is hereby incorporated by reference.

The invention claimed is:

1. A ground penetrating radar measurement system for measuring ground penetrating radar (GPR) data, the measurement system comprising:
   a) a control unit for controlling the operation of the measurement system;
   b) a sampling coordination unit connected to the control unit for controlling the timing of generation of stimulus electromagnetic waves and spatial sampling rate of reflected electromagnetic waves in response to the stimulus electromagnetic waves, the sampling coordination unit being adapted to adjust the timing of the generation of the stimulus electromagnetic waves and the sampling rate of the reflected electromagnetic waves for spatially over-sampling the ground penetrating radar data with respect to a minimum Nyquist spatial sampling interval;
   c) transmission circuitry connected to the control unit and the sampling coordination unit, the transmission circuitry generates the stimulus electromagnetic waves;
   d) receiving circuitry connected to the control unit and the sampling coordination unit, the receiving circuitry senses and records the reflected electromagnetic waves; and
   e) a motion detection module connected to one of the sampling coordination unit and the control unit for providing speed and position information of the measurement system, wherein the sampling coordination unit adjusts the amount of spatial over-sampling according to the speed of the measurement system.

2. The measurement system of claim 1, wherein the measurement system further includes an operator feedback module connected to the control unit for providing an operator of the measurement system with a GPR data quality indicator for informing the operator to increase or decrease the speed of the measurement system.

3. The measurement system of claim 2, wherein the GPR data quality indicator includes a numerical value.

4. The measurement system of claim 2, wherein the GPR data quality indicator includes graphical information.

5. The measurement system of claim 2, wherein the GPR data quality indicator includes Signal-to-Noise Ratio (SNR) of the measured GPR data.

6. The measurement system of claim 5, wherein the SNR can be maintained at a desired level by adjusting the speed (v) of the measurement system according to:

$$v = \frac{n}{\delta B}\left(\frac{SNR_{REF}}{SNR_{DES}}\right)^2$$

where n is the Nyquist spatial sampling interval, δ is an instrumentation dependent factor for the measurement system, B is a maximum time of flight for a GPR trace, $SNR_{REF}$ is the current signal-to-noise level of the measured GPR data, and $SNR_{DES}$ is the desired signal-to-noise level of the measured GPR data.

7. The measurement system of claim 2, wherein the GPR data quality indicator includes an image of the measured GPR data.

8. The measurement system of claim 2, wherein the GPR data quality indicator is recorded along with the measured GPR data.

9. The measurement system of claim 2, wherein the operator is provided by an automated means.

10. The measurement system of claim 2, wherein the transmission circuitry includes a transmitter unit and at least one transmitter antenna for generating the stimulus electromagnetic waveforms and radiating the stimulus electromagnetic waveforms into a subsurface environment, and the receiving circuitry includes at least one receiver antenna and a receiver unit for sensing the reflected electromagnetic waves.

11. A ground penetrating radar measurement system for measuring ground penetrating radar (GPR) data, the measurement system comprising:
   a) a control unit for controlling the operation of the measurement system;
   b) a sampling coordination unit connected to the control unit for controlling the timing of generation of stimulus electromagnetic waves and spatial sampling rate of reflected electromagnetic waves in response to the stimulus electromagnetic waves;
   c) transmission circuitry connected to the control unit and the sampling coordination unit, the transmission circuitry generates the stimulus electromagnetic waves;
   d) receiving circuitry connected to the control unit and the sampling coordination unit, the receiving circuitry senses and records the reflected electromagnetic waves; and,
   e) an operator feedback module connected to the control unit for providing an operator of the measurement system with a GPR data quality indicator for informing the operator to increase or decrease the speed of the measurement system based on a desired level of signal quality for measured GPR data.

12. The measurement system of claim 11, wherein the quality of the measured GPR data can be maintained at a desired level by adjusting the speed (v) of the measurement system according to:

$$v = \frac{n}{\delta B}\left(\frac{SNR_{REF}}{SNR_{DES}}\right)^2$$

where n is the Nyquist spatial sampling interval, δ is an instrumentation dependent factor for the measurement system, B is a maximum time of flight for a GPR trace, $SNR_{REF}$ is the current signal-to-noise level of the measured GPR data, and $SNR_{DES}$ is the desired signal-to-noise level of the measured GPR data.

13. The measurement system of claim 11, wherein the measurement system further includes a motion detection module connected to one of the sampling coordination unit and the control unit for providing speed and position information of the measurement system, wherein the sampling coordination unit adjusts the spatial sampling rate according to the speed of the measurement system to over-sample the GPR data with respect to a minimum Nyquist spatial sampling interval.

14. A method for controlling the measurement of ground penetrating radar (GPR) data by a GPR measurement system, the method comprising:
  a) generating a sampling factor for spatially over-sampling the GPR data with respect to a minimum Nyquist spatial sampling interval;
  b) adjusting the rate of generation of stimulus electromagnetic waves according to the sampling factor;
  c) adjusting the sampling rate of reflected electromagnetic waves in response to the stimulus electromagnetic waves according to the sampling factor;
  d) detecting speed and position information of the measurement system, and decreasing the value of the sampling factor when the speed of the measurement system is increased and increasing the value of the sampling factor when the speed of the measurement system is decreased; and
  e) measuring the GPR data.

15. The method of claim 14, wherein the method further includes providing a GPR data quality indicator to an operator of the measurement system for informing the operator to increase or decrease the speed of the measurement system based on a desired level of signal-to-noise quality of measured GPR data.

16. The method of claim 15, wherein the method includes incorporating a numerical value into the GPR data quality indicator.

17. The method of claim 15, wherein the method includes incorporating graphical information into the GPR data quality indicator.

18. The method of claim 15, wherein the method includes incorporating Signal-to-Noise Ratio (SNR) of the measured GPR data into the GPR data quality indicator.

19. The method of claim 18, wherein the method includes maintaining the SNR of the measured GPR data at a desired level by adjusting the speed (v) of the measurement system according to:

$$v = \frac{n}{\delta B}\left(\frac{SNR_{REF}}{SNR_{DES}}\right)^2$$

where n is the Nyquist spatial sampling interval, δ is an instrumentation dependent factor for the measurement system, B is a maximum time of flight for a GPR trace, $SNR_{REF}$ is the current signal-to-noise level of the measured GPR data, and $SNR_{DES}$ is the desired signal-to-noise level of the measured GPR data.

20. The method of claim 15, wherein the method includes providing an image of the measured GPR data as the GPR data quality indicator.

21. The method of claim 15, wherein the method includes recording the GPR data quality indicator along with the GPR data.

22. A method for controlling the measurement of ground penetrating radar (GPR) data by a GPR measurement system, the method comprising:
  a) generating a sampling factor for sampling the GPR data with respect to a minimum Nyquist spatial sampling interval;
  b) adjusting the rate of generation of stimulus electromagnetic waves according to the sampling factor;
  c) adjusting the sampling rate of reflected electromagnetic waves in response to the stimulus electromagnetic waves according to the sampling factor;
  d) measuring the GPR data; and,
  e) providing a GPR data quality indicator based on the measured GPR data to an operator of the measurement system for informing the operator to increase or decrease the speed of the measurement system.

23. The method of claim 22, wherein the method further includes maintaining signal quality of measured GPR data at a desired level by adjusting the speed (v) of the measurement system according to:

$$v = \frac{n}{\delta B}\left(\frac{SNR_{REF}}{SNR_{DES}}\right)^2$$

where n is the Nyquist spatial sampling interval, δ is an instrumentation dependent factor for the measurement system, B is a maximum time of flight for a GPR trace, $SNR_{REF}$ is the current signal-to-noise level of the measured GPR data, and $SNR_{DES}$ is the desired signal-to-noise level of the measured GPR data.

24. The method of claim 22, wherein step a) of the method includes detecting speed and position information of the measurement system and adjusting the sampling factor according to the speed of the measurement system.

25. A method for measuring ground penetrating radar (GPR) data with a GPR measurement system, the method comprising:
  a) setting a value for a sampling factor for sampling the GPR data;
  b) measuring the GPR data according to the sampling factor;
  c) reviewing operator feedback based on the quality of the measured GPR data; and,
  d) adjusting the speed of the GPR measurement system based on the operator feedback.

* * * * *